UNITED STATES PATENT OFFICE.

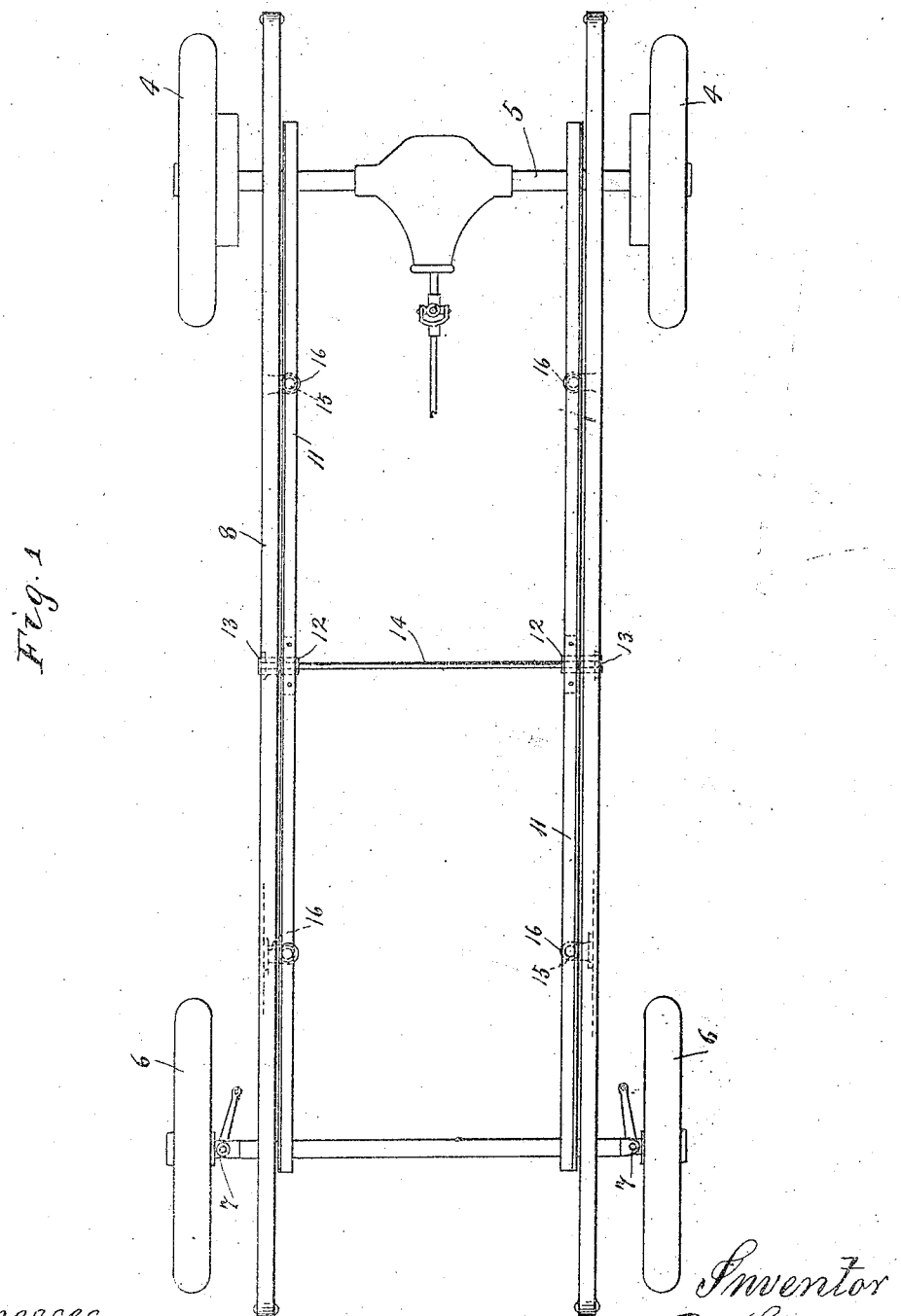

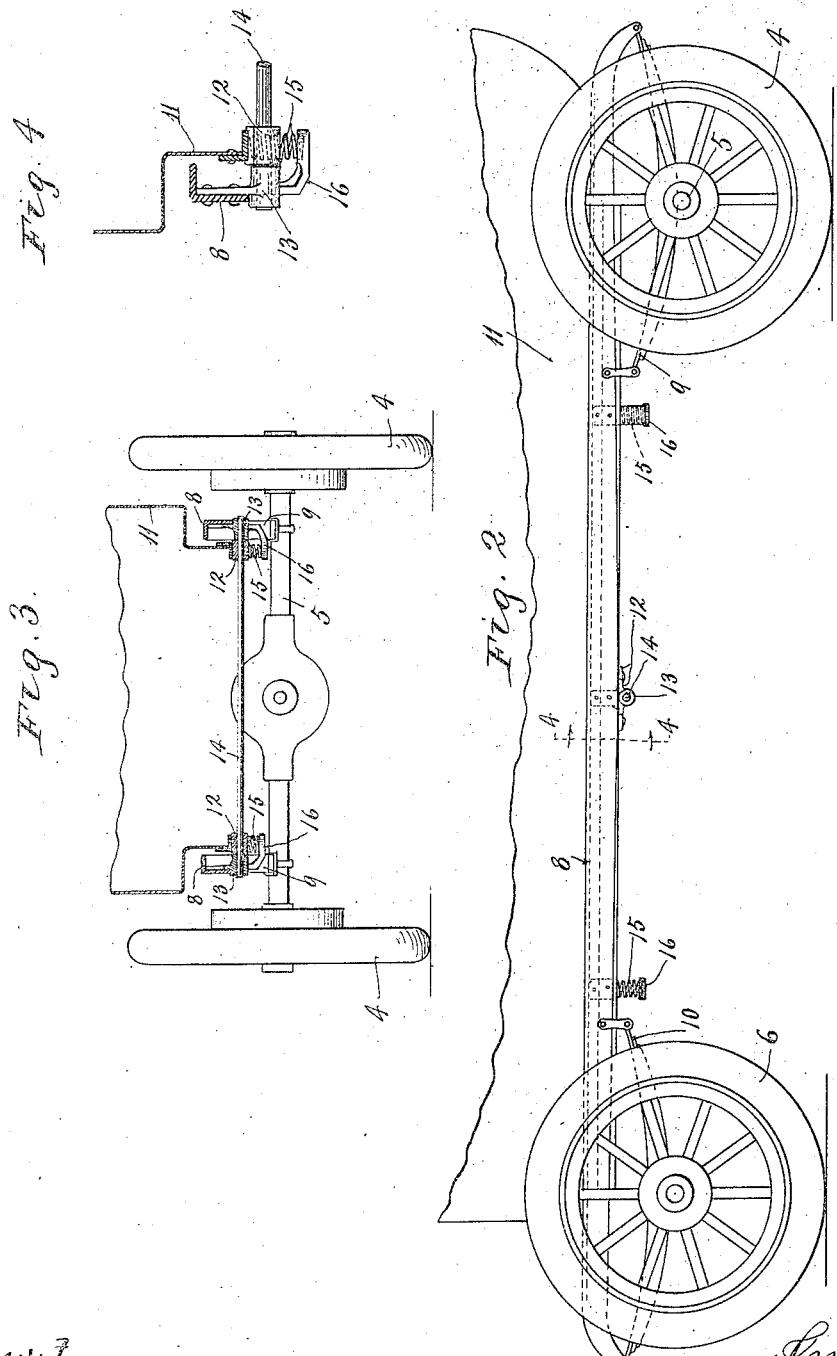

PETER S. LARSON, OF WILLISTON, NORTH DAKOTA.

FRAME AND BODY STRUCTURE FOR AUTOMOBILES.

1,275,272.

Specification of Letters Patent. Patented Aug. 13, 1918.

Application filed April 2, 1917. Serial No. 159,147.

*To all whom it may concern:*

Be it known that I, PETER S. LARSON, a citizen of the United States, residing at Williston, in the county of Williams and State of North Dakota, have invented certain new and useful Improvements in Frames and Body Structures for Automobiles; and I do hereby declare the following to be a full, clear, and exact description of the invention, such as will enable others skilled in the art to which it appertains to make and use the same.

Particularly, my invention relates to automobiles and has for its object to provide an improved means for mounting the body thereof on the frame work of such vehicle.

Generally stated, the invention consists of the novel devices and combinations of devices hereinafter described and defined in the claims.

It is a well known fact that in automobiles and other vehicles, there is less vibration at the center of the machine or midway between the front and rear wheels than at either the front or the rear of the vehicle body. This is because irregularities of the road seldom, if ever, produce like shocks at both front and rear at the same time. I have discovered that by pivotally connecting the intermediate portion of the body and frame of the machine and by interposing springs or cushioning devices between the end portions thereof, it is possible to make the front and rear portions of the vehicle as easy riding and as free from shocks as the central portion thereof.

In the accompanying drawings, which illustrate the invention, like characters indicate like parts throughout the several views.

Referring to the drawings:

Figure 1 is a plan view of the frame work and running gear of the automobile, the body thereof being removed;

Fig. 2 is a side elevation of the running gear, frame, and platform structure of the body of the vehicle;

Fig. 3 is a view partly in rear elevation and partly in vertical section, showing the running gear, frame and body of the automobile, and Fig. 4 is a section on the line 4—4 of Fig. 2.

Of the parts of the running gear, the numeral 4 indicates the rear wheels, the numeral 5 the rear axle structure, the numeral 6 the front wheels, the numeral 7 the knuckles, and the numeral 8 the frame, the numeral 9 the rear springs, and the numeral 10 the front springs, all of which parts may be assumed to be of the usual construction.

The body of the automobile is indicated as an entirety by the numeral 11. At the intermediate portion of its opposite sides, the body 11 is provided with rigidly secured sleeves 12 that are pivotally connected to similar flanged sleeves 13 on the intermediate portions of the side bars of the frame 8, as shown, by a transverse hinge rod 14. This pivot 14 is preferably about midway between the front and rear wheels.

Auxiliary springs 15, as shown in the form of spring coils, are interposed between the side bars of the frame 8 and the inturned ends of depending brackets 16 that are rigidly secured to the side bars of said frame 8. These springs 15 tend to hold the body 11 approximately parallel to the frame 8, and they should be strong enough to do so under ordinary conditions, or when running on smooth road. When, however, either front or rear wheel runs over an obstruction or through a chuck hole, or the like, the shock will not only be absorbed by the main spring 9 or 10, as the case may be, but will be further absorbed by the corresponding auxiliary spring 15 so that the vehicle body will not receive even as much of the shock as the frame 8. The combined action of the main and auxiliary springs and the pivotal movement of the main frame independent of the body, very greatly relieve passengers from shocks and vibrations produced by rough roads.

Obviously, the invention may be applied at very small cost and without interfering in any way with the customary running gear of an automobile or similar vehicle.

What I claim is:

1. In an automobile or similar vehicle, the combination with a running gear including front wheels, rear wheels, front axle, rear axle, main frame, and main springs supporting said main frame from said front and rear axles, of a vehicle body intermediately pivoted to said main frame, and auxiliary springs connected between said main frame and body and exerting a yielding force tending to maintain said body in an intermediate position in respect to said main frame.

2. In an automobile, or similar vehicle, the combination of a running gear including the frame, of a body pivotally connected to said frame by an intermediate pivot located between front and rear wheels, and springs interposed between said frame and body at points both in front and at the rear of said pivot.

3. In an automobile, or similar vehicle, the combination with a running gear including front wheels, rear wheels, front axle, rear axle, main frame and main springs, the latter supporting said frame from said front and rear axles, of a vehicle body intermediately pivoted to said main frame, and auxiliary springs interposed between said frame and body on both sides of the vehicle and at points both in front and at the rear of said pivot.

4. In an automobile, or similar vehicle, the combination with a running gear including front wheels, rear wheels, front axle, rear axle, main frame and main springs, the latter supporting said frame from said front and rear axles, of a vehicle body intermediately pivoted to said main frame, the lower portion of said body being set below and inward of the side bars of said main frame, brackets secured to said side frames at front and rear of said pivot and having inturned lower ends, and springs interposed between said brackets and said body.

In testimony whereof I affix my signature in presence of two witnesses.

PETER S. LARSON.

Witnesses:
CLARA DEMAREST,
MAY A. SMITH.